United States Patent Office 3,332,925
Patented July 25, 1967

3,332,925
PROCESS FOR POLYMERIZING PROPYLENE
Russell G. Hay, Gibsonia, David M. Jenkins, Pittsburgh, and Robert A. Walde, Emmaus, Pa., assignors to Gulf Research & Development Company, Pittsburgh, Pa., a corporation of Delaware
No Drawing. Filed Dec. 23, 1963, Ser. No. 332,863
8 Claims. (Cl. 260—93.7)

This invention relates to a process for polymerizing propylene.

We have found that when propylene is polymerized in the presence of a catalyst system composed of an orgnao-metallic compound and titanium trichloride the polymerization rate is enhanced if the organometallic compound and titanium trichloride are maintained in intimate relationship with each other for a selected amount of time at a temperature below polymerization temperature, propylene is then added to the catalyst system and the resultat mixture held for a selected amount of time at a temperature also below polymerization temperature and thereafter polymerization of propylene is effected in the presence of said catalyst system at polymerization temperatures.

The first step in the process involves bringing together the components of the catalyst system in an inert diluent and in an inert atmosphere. One component of the catalyst system is titanium trichloride. The other component of the catalyst system is an organometallic compound of an alkali metal, alkaline earth metal, zinc, earth metal or rare earth metal. The organometallic compound can contain, if desired, one or more metal-halide bonds. The hydrocarbon portion of the organometallic compound can be one or more alkyl substituents having from one to 18 carbon atoms or an aryl substituent. Aluminum trialkyls, however, are the preferred organometallic compounds. Examples of such organometallic compounds that can be employed in combination with titanium trichloride are trimethyl aluminum, triethyl aluminum, triisobutyl aluminum, trihexyl aluminum, trioctadecyl aluminum, ethyl aluminum sesquichloride, diethyl aluminum iodide, diethyl zinc, phenyl magnesium bromide, n-butyl lithium, lithium aluminum tetraethyl, tetrabutyl tin, diethyl beryllium, amyl sodium, etc. The molar ratio of the organometallic compound to titanium trichloride is from about 0.5:1 to about 10:1, preferably from about 2:1 to about 4:1. The diluent employed must be inert to said catalyst components and to the propylene polymer employed. Examples of such diluents are n-butane, n-heptane, isooctane, cyclohexane, benzene, etc. The amount of diluent is not critical, but must be sufficient to maintain the reaction mixture fluid enough to insure adequate agitation. From a practical standpoint, the diluent is preferably from about four to about 10 parts per part by weight of polymer produced. To provide the inert atmosphere nitrogen can be employed.

Once the titanium trichloride, organometallic compound, diluent and inert gas are in intimate relationship with each other, the mixture is heated at a temperature of about 0° to about 70° C., preferably at a temperature of about 30° to about 60° C. for about one to about 90 minutes, preferably for about two to about 30 minutes. This heating of the catalyst components below polymerization temperature must be effected in the absence of propylene. The pressure during this stage of the process is not critical. It may be the vapor pressure of the inert diluent or a higher pressure imposed by the inert atmosphere (nitrogen) for operating convenience. It is believed that the effective polymerization catalyst that will be employed herein is not composed of a physical mixture of the defined aluminum alkyl and titanium trichloride but of a reaction product resulting from the defined heating.

The second step of the procedure defined herein involves adding propylene to the mixture resulting from the heating step defined above at a temperature of about 10° to about 70° C., preferably about 30° to about 60° C. The amount of propylene added in this step is critical and must be at least equal in amount, on a molar basis, to the catalyst, preferably at least from ten to 20 times the molar amount thereof. Amounts in excess thereof can be added, if desired, but are not required. It is imperative, too, that the catalyst system be maintained in the presence of the propylene so added at the defined temperature at a pressure of about two to about 600 pounds per square inch gauge, preferably at a pressure of about 10 to about 80 pounds per square inch gauge, for about one to about 30 minutes, preferably for about two to about 15 minutes.

The third step of the process involves raising the temperature of the reaction mixture resulting from the second step defined above to the polymerization temperature, which can be from about 70° to about 180° C., preferably from about 90° to about 130° C. The pressure can be from about five to about 600 pounds per square inch gauge, preferably about 50 to about 150 pounds per square inch gauge. The time required for polymerization of the propylene to a polymer having a molecular weight of about 100,000 to about 5,000,000 can be about five minutes to about 24 hours, preferably can be from about 30 minutes to about six hours.

At the end of the reaction period, the propylene polymer can be recovered by cooling the reaction mixture to a temperature of about 0° to about 50° C. and reducing the pressure to atmospheric pressure. About 0.1 to about 20 volumes, relative to the reaction mixture, of a non-solvent for the polypropylene, for example, an alcohol such as methanol, isopropanol, n-butanol etc., can be added thereto. The polymer can be recovered therefrom by filtration. The diluent can be recovered from the filtrate by subjecting the latter to temperatures and pressures conducive to the distillation of said diluent.

The procedure of this invention can be further understood from the following. A number of runs were made wherein propylene was subjected to the action of a system containing titanium trichloride and triethyl aluminum. The titanium trichloride was employed as received and was found to contain about 22.4 percent by weight thereof of aluminum chloride. It is not believed, however, that the latter materially affected the course of the reaction. The diluent employed was cyclohexane. The polymer was precipitated from the reaction mixture with methanol. The data from the series of runs are tabulated below in Table I. The titanium trichloride and triethyl aluminum in each instance were added together to the reaction system at a temperature of 30° C. The polymerization rate is determined from the time the reaction mixture reaches polymerization temperature. Propylene was added to the reaction system at polymerization temperature at a rate sufficient to maintain the propylene pressure constant.

TABLE I

| Ex. | Catalyst concentration, millimol per liter of diluent | | Polymerization | | Time to C$_3$H$_6$ addition, minutes | Temp. at C$_3$H$_6$ addition, 0° C. | Initial pressure at C$_3$H$_6$ addition, p.s.i.g. | Time in temperature range after addition of C$_3$H$_6$ below polymerization temperature | | | 80° C. to polymerization temp. | Polymerization rate, grams per hour | Melt flow (ASTM D-1238) 2,160 gram load, 230° C. grams/10 minutes |
|---|---|---|---|---|---|---|---|---|---|---|---|---|---|
| | TiCl$_3$ | Al(C$_2$H$_4$)$_3$ | Temp., ° C. | Pres., p.s.i.g. | | | | Below 40° C. | 40–60° C. | 60–80° C. | | | |
| I | 7.5 | 30.5 | 120 | 100 | 70 | 110 | 110 | 0 | 0 | 0 | 5 | 40 | 5.5 |
| II | 7.5 | 30.5 | 120 | 100 | 45 | 112 | 152 | 0 | 0 | 0 | 5 | 40 | 5.5 |
| III | 7.5 | 30.5 | 120 | 150 | 35 | 126 | 150 | 0 | 0 | 0 | 0 | 56 | 9.8 |
| IV | 7.5 | 30.5 | 120 | 100 | 30 | 70 | 100 | 0 | 0 | 11 | 4 | 118 | 3.3 |
| V | 2 | 6 | 120 | 100 | 15 | 10 | 12 | 12 | 3 | 2 | 8 | 74 | 4.2 |
| VI | 2 | 6 | 120 | 100 | 15 | 31 | 25 | 12 | 2 | 2 | 3 | 96 | 0.8 |
| VII | 2 | 6 | 120 | 100 | 35 | 50 | 50 | 0 | 12 | 2 | 3 | 115 | 2.8 |
| VIII | 2 | 6 | 120 | 100 | 30 | 70 | 70 | 0 | 0 | 12 | 8 | 64 | 1.2 |
| IX | 2 | 6 | 100 | 125 | 19 | 50 | 50 | 0 | 6 | 2 | 3 | 155 | 0.6 |
| X | 2 | 6 | 100 | 125 | 23 | 50 | 50 | 0 | 10 | 3 | 2 | 139 | 0.7 |
| XI | 2 | 6 | 120 | 100 | 0 | 31 | 25 | 1 | 1 | 1 | 6 | 15 | |

An inspection of the data in Table I illustrates the advantages of operating in accordance with the procedure defined and claimed herein. Note that in each of Examples I, II and III, wherein the propylene was added to the catalyst mixture at polymerization temperature, the rate of polymerization was low. In Example XI wherein propylene was added to the catalyst mixture before the catalyst mixture was initially heated for the defined length of time the rate of polymerization was also low. In the remaining examples wherein the catalyst components were heated together below polymerization temperature, propylene was then added thereto and the resulting mixture again heated below polymerization temperature and thereafter the resulting mixture was heated to polymerization temperature and the desired polymerization was permitted to take place, the rate of propylene polymerization was extremely high.

Examples XII and XIII below show that while the procedure defined herein is effective for the polymerization of propylene the same is not effective for the polymerization of butene-1.

EXAMPLE XII

Titanium trichloride and triethyl aluminum were brought together at 30° C. in a paraffinic diluent under a nitrogen atmosphere. The diluent was composed of a mixture of about 28 percent n-decane, 11 percent n-dodecane, 35 percent n-tetradecane and 26 percent n-hexadecane. The catalyst concentrations were 0.002 mol per liter of titanium trichloride and 0.006 mol per liter of triethyl aluminum. The reaction mixture was then heated to 50° C. and held at this temperature for five minutes before heating to polymerization temperature. The reaction mixture was heated to 100° C. and butene-1 was added to the reaction mixture to bring the pressure to 20 pounds per square inch gauge. The total time prior to the addition of butene-1 was 12 minutes. After 1.5 hours about 30 cc. of methanol per liter of diluent were added to stop the polymerization. The reaction mixture was cooled and the polymer was precipitated in methanol. The rate of polymerization was 34.4 grams per liter per hour.

EXAMPLE XIII

The procedure of Example XII was repeated except that butene-1 was added to the reaction mixture after the catalyst components had been mixed for five minutes at 50° C. The reaction mixture was held at about 50° C. and eight pounds per square inch gauge for five minutes, then heated to 100° C. When the temperature reached 100° C. the pressure was increased to 20 pounds per square inch gauge. The catalyst components were mixed for six minutes prior to the addition of butene-1, and for 19 minutes between the addition of butene-1 and the attainment of the polymerization temperature of 100° C. The rate of polymerization was 38.6 grams per liter per hour.

Obviously many modifications and variations of the invention, as hereinabove set forth, can be made without departing from the spirit and scope thereof, and therefore only such limitations should be imposed as are indicated in the appended claims.

We claim:

1. A process for polymerizing propylene which comprises heating a mixture containing titanium trichloride and an aluminum alkyl selected from the group consisting of aluminum trialkyls and alkyl aluminum halides in an inert atmosphere at a temperature of about 0° to about 70° C. for about one to about 90 minutes, adding propylene to the resulting mixture at a temperature of about 10° to about 70° C. and heating the same for about one to about 30 minutes and thereafter subjecting propylene to polymerization in the presence of said resulting mixture at a temperature of about 70° to about 180° C.

2. A process for polymerizing propylene which comprises heating a mixture containing titanium trichloride and an aluminum trialkyl in an inert atmosphere at a temperature of about 0° to about 70° C. for about one to about 90 minutes, adding propylene to the resulting mixture at a temperature of about 10° to about 70° C. and heating the same for about one to about 30 minutes and thereafter subjecting propylene to polymerization in the presence of said resulting mixture at a temperature of about 70° to about 180° C.

3. A process for polymerizing propylene which comprises heating a mixture containing titanium trichloride and triethyl aluminum in an inert atmosphere at a temperature of about 0° to about 70° C. for about one to about 90 minutes, adding propylene to the resulting mixture at a temperature of about 10° to about 70° C. and heating the same for about one to about 30 minutes and thereafter subjecting propylene to polymerization in the presence of said resulting mixture at a temperature of about 70° to about 180° C.

4. A process for polymerizing propylene which comprises heating a mixture containing titanium trichloride and triethyl aluminum in an inert atmosphere at a temperature of about 30° to about 60° C. for about two to about 30 minutes, adding propylene to the resulting mixture at a temperature of about 30° to about 60° C. and heating the same for about two to about 15 minutes and thereafter subjecting propylene to polymerization in the presence of said resulting mixture at a temperature of about 90° to about 130° C.

5. A process for polymerizing propylene which comprises heating a mixture containing titanium trichloride and triethyl aluminum in an inert atmosphere at a temperature of about 50° C. for about 10 minutes, adding propylene to the resulting mixture at a temperature of about 50° C. and heating the same for about five minutes and thereafter subjecting propylene to polymerization in the presence of said resulting mixture at a temperature of about 120° C.

6. A process for polymerizing propylene which comprises heating a mixture containing an aluminum trialkyl and titanium trichloride in a molar ratio of about 0.5:1 to about 10:1 in an inert atmosphere at a temperature of about 0° to about 70° C. for about one to about 90 minutes, adding propylene to the resulting mixture at a temperature of about 10° to about 70° C. and heating the same for about one to about 30 minutes and thereafter subjecting propylene to polymerization in the presence of said resulting mixture at a temperature of about 70° to about 180° C.

7. A process for polymerizing propylene which comprises heating a mixture containing triethyl aluminum and titanium trichloride in a molar ratio of about 0.5:1 to about 10:1 in an inert atmosphere at a temperature of about 0° to about 70° C. for about one to about 90 minutes, adding propylene to the resulting mixture at a temperature of about 10° to about 70° C. and heating the same for about one to about 30 minutes and thereafter subjecting propylene to polymerization in the presence of said resulting mixture at a temperature of about 70° to about 180° C.

8. A process of polymerizing propylene which comprises heating a mixture containing triethyl aluminum and titanium trichloride in a molar ratio of about 2:1 to about 4:1 in an inert atmosphere at a temperature of about 30° to about 60° C. for about two to about 30 minutes, adding propylene to the resulting mixture at a temperature of about 30° to about 60° C. and heating the same for about two to about 15 minutes and thereafter subjecting propylene to polymerization in the presence of said resulting mixture at a temperature of about 90° to about 130° C.

References Cited

UNITED STATES PATENTS

| | | | |
|---|---|---|---|
| 3,067,183 | 12/1962 | Hagemeyer | 260—94.9 |
| 3,112,301 | 11/1963 | Natta | 260—94.9 |
| 3,141,872 | 7/1964 | Natta | 260—94.9 |
| 3,201,192 | 8/1965 | Siggel | 260—94.9 |

FOREIGN PATENTS 538,782  12/1955  Belgium.

JOSEPH L. SCHOFER, *Primary Examiner.*

E. L. DENSON, *Assistant Examiner.*